United States Patent
Brigance et al.

(10) Patent No.: US 6,423,109 B2
(45) Date of Patent: Jul. 23, 2002

(54) FREE FLOWING FERTILIZER COMPOSITION WITH ENHANCED DEPOSITION/ANTI DRIFT CHARACTERISTICS

(75) Inventors: Mickey Brigance; Greg McManic, both of Germantown, TN (US)

(73) Assignee: Adjuvants Unlimited Inc., Tulsa, OK (US)

( * ) Notice: Subject to any disclaimer, the term of this patent is extended or adjusted under 35 U.S.C. 154(b) by 0 days.

(21) Appl. No.: 09/761,643

(22) Filed: Jan. 18, 2001

Related U.S. Application Data

(60) Provisional application No. 60/176,617, filed on Jan. 19, 2000.

(51) Int. Cl.$^7$ .................................................. C05B 7/00
(52) U.S. Cl. ..................... 71/34; 71/54; 71/58; 71/59; 71/64.13; 504/116.1
(58) Field of Search ............................... 71/54, 34, 58, 71/59, 64.13; 504/116.1

(56) References Cited

U.S. PATENT DOCUMENTS

| | | | | |
|---|---|---|---|---|
| 3,933,458 A | * | 1/1976 | Philipp | 71/27 |
| 3,950,159 A | * | 4/1976 | Fox et al. | 71/11 |
| 4,510,081 A | * | 4/1985 | Bronner et al. | 252/603 |
| 4,610,311 A | * | 9/1986 | Bronner et al. | 169/45 |
| 4,797,145 A | * | 1/1989 | Wallace et al. | 71/27 |
| 5,264,471 A | * | 11/1993 | Chmelir | 524/35 |
| 5,525,575 A | * | 6/1996 | Chamberlain | 504/116 |
| 5,529,975 A | * | 6/1996 | Chamberlain | 504/116 |
| 5,550,224 A | * | 8/1996 | Hazen | 536/114 |
| 5,824,797 A | * | 10/1998 | Hazen | 536/114 |
| 5,874,096 A | * | 2/1999 | Hazen | 424/405 |
| 5,964,917 A | * | 10/1999 | Latting | 71/49 |
| 6,288,010 B1 | * | 9/2001 | Rose et al. | 504/206 |

* cited by examiner

*Primary Examiner*—Chhaya D. Sayala
(74) *Attorney, Agent, or Firm*—Smith, Gambrell & Russell, LLP

(57) ABSTRACT

A free-flowing fertilizer comprising:
  i) from 25 to 99.5% by weight of a powdered water soluble nitrogen containing fertilizer.
  ii) from 0.05 to 1.5% by weight of a polyacrylamide liquid emulsion/dispersion.
  iii) from 0.1 to 3.0% by weight of a polyacrylamide powder whose particle size is primarily 50 to 100 mesh in size.

18 Claims, No Drawings

FREE FLOWING FERTILIZER COMPOSITION WITH ENHANCED DEPOSITION/ANTI DRIFT CHARACTERISTICS

REFERENCE TO A RELATED APPLICATION

This application claims the benefit of the priority application 60/176,617, filed Jan. 19, 2000, which is relied on herein.

INTRODUCTION AND BACKGROUND

The present invention relates to a process and compositions for producing a free flowing fertilizer which exhibits enhanced deposition and anti drift characteristics.

More particularly, the process of the present invention relates to controlling the particle size of the fertilizer to a range which is more course than a fine powder but finer than unprocessed material, spraying onto the presized fertilizer a liquid deposition agent, blending until homogeneous, and post adding other agents such as defoamers, anticaking agents, other deposition enhancement agents, surface active agents, dispersing agents, crystalline inhibitor agents, other sequestering agents, shear resistant anti drift agents and the like and screening out oversized particles if necessary.

The use of fertilizers such as ammonium sulfate to enhance herbicide and pesticide performance is well documented. The need for deposition enhancement and resistance to drift is also well documented. Prior efforts have been made to address these issues. For example, guar as a deposition enhancement component for fertilizer compositions has been suggested in U.S. Pat. No. 5,964,917. The use of polyacrylamide suspensions/emulsions as a deposition enhancement agent for tank mix applications is also known, see U.S. Pat. Nos. 5,550,224; 5,824,797 and 5,874,096. The above patents are relied on and incorporated herein for the disclosure of the polyacrylamide polymers.

To be able to combine the effectiveness of a polyacrylamide suspension/emulsion deposition enhancement agent with fertilizer components such ammonium sulfate would be a desirable feature.

Incorporating a liquid deposition agent onto a fertilizer component presents obstacles to overcome such as tackiness of the mixture, caking in the bag, scaling of the liquid deposition agent with the fertilizer resulting in particles which will not disperse readily in the spray tank or deactivation of the deposition agent and other agents.

Other desirable components that can be incorporated into fertilizer compositions include but are not limited to defoaming agents, surface active agents, potentiating agents, dispersing agents, crystalline inhibitor agents, other dry deposition/anti drift agents, other sequestering agents, shear resistant anti drift agents, and the like.

Polyacrylamides have been used in dry fertilizer mixtures. Sanitek Products has a product known as 41A—FG(Fine Grind) which is a dry milled polyacrylamide mixture with xanthan gum. See U.S. Pat. Nos. 4,510,081 and 4,610,311. These two patents are relied on for the disclosure relating to the polyacrylamide polymers. This product is easy to use in dry systems but is effective only at high concentrations. The polyacrylamide must be ground to a fine particle size to overcome tank mixing problems. When the polyacrylamide dry particles are hydrated, if they are not very small initially, they will swell to form "fish eyes" which can block in line screens and nozzles resulting in pressure buildup in the system and spotty spray patterns. When the polyacrylamide particles are ground to a fine size, a significant reduction in anti drift/deposition efficiency is noted requiring the use of much higher concentrations to achieve adequate control.

Agricultural pesticides prior to spraying often benefit from specific additives to the spray mix which provide functionality that is either not possible or practical as commercial pesticide formulations. These functionalities include but are not limited to the sequestering of antagonistic metal ions found in the water used for spraying or as micronutrients added to the tank to correct soil deficiencies, improved target deposition, reduction of off target drift, foam control, increase in droplet drying time to allow additional absorption time, decreased surface tension/wetting, improved absortion and the like.

Off target drift and enhanced deposition of pesticide containing spray droplets has been an industry issue for many years. This issue has been magnified with the advent of the Biogenetic Era. It is now a common event to spray a powerful herbicide such as glyphosate onto crops such as soybeans which have been genetically engineered to resist damage by glyphosate. At the time of spraying it is not unusual to have glyphosate sensitive crops such as corn growing nearby. Without using good drift management techniques, it is possible to injure or kill young growing corn plants with off target drift containing glyphosate.

Off target drift effects performance of pesticides as the portion which drifts away is not effective on the proper target. This loss of pesticide activity impacts the farmer negatively with reduced crop yields. Therefore, it is desirable to reduce off target drift of the spray mist while enhancing proper deposition onto the intended target. The deposition enhancement effect of droplet adhesion has been studied extensively within the industry. When spray droplets hit the intended target, it is desirable for them to hit and stay on the target rather than to bounce off. The anti bounce effect is related to droplet size and also to droplet elasticity. The greater the retention of the droplet on the target, the more efficient the droplet is in having its intended pesticidal effect.

It is generally considered within the industry that the optimum size of the spray droplet to minimize off target drift while enhancing proper deposition is in the 200 to 400 micron range. Droplets smaller than 150 microns are highly susceptible to drift. Droplets larger than 400 microns represent reduced coverage and therefore reduced pesticide efficiency.

An object of this invention is to provide a convenient and easy-to-use fertilizer composition which offers improved resistance to off-target drift as well as improved deposition onto the desired target.

Another object of the invention is to provide optionally additional functionality such as enhanced sequestering of metal ions found in the water used for spraying or added to the spray mix to correct soil deficiencies, effective foam control, decrease in evaporation rate, decreased surface tension/wetting times, and as a result improved pesticide activity.

SUMMARY OF THE INVENTION

The above and other objects of the invention can be achieved by a combination of dry milled polyacrylamide and a liquid polyacrylamide emulsion/suspension plus other functioning agents for applications to a properly sized solid fertilizer.

Traditional polyacrylamide dry systems are very sensitive to shear and show substantially reduced performance as the tank mix is recirculated through the pumping system. By combining the mixture of a dry milled polyacrylamide with a polyacrylamide emulsion/dispersion, differing rates of hydration from the different systems are used to extend the time of control under different shear rates through the pumping system.

Incorporation of other shear resistant polymers can further extend the time of activity under shear stress.

DETAILED DESCRIPTION OF THE INVENTION

According to a feature of the invention, the free-flowing fertilizer of the invention is comprised of the following:
   i) from 25 to 99.5% by weight of a powdered water soluble nitrogen containing fertilizer such as ammonium sulfate, urea, ammonium nitrate, potassium nitrate, diammonium phosphate.
   ii) from 0.05 to 1.5% by weight of a polyacrylamide liquid emulsion/dispersion such as Percol E 38 from Ciba Specialties containing a high molecular weight non-ionic or anionic polymer
   iii) from 0.1 to 3.0% by weight of a polyacrylamide powder whose particle size has been reduced to be primarily 50 to 100 mesh in size such as Magnafloc 156F from Ciba Specialties
   iv) from 0 to 5% of a powdered silicone defoamer such as AU-319 from Adjuvants Unlimited Inc. or other suitable silicone defoamers on a water soluble powdered base
   v) from 0 to 30% of a nonionic powdered surfactant prepared preferably as a clathrate(urea complex)
   vi) from 0 to 50% of specialty sequestering agents/sequestered metals such as ethylene diamine tetra acetic acid(or its salts), citric acid(or its salts), phosphoric acid salts (preferably ammonium phosphate)
   vii) from 0 to 1.5% of anti caking compounds such as finely ground diatomaceous earth, kaolen clay, polymorphous silica, and the like.

According to another feature of the invention, the process for manufacturing a free flowing, powder fertilizer composition comprises:
   a) intimately blend the following:
      i) from 25 to 99.5% by weight of the formula, milled dry fertilizer,
      ii) spraying from 0.05 to 1.5% by weight, of a liquid drift control agent such as a polyacrylamide emulsion/dispersion onto the dry milled fertilizer while under constant blending in a ribbon blender or equivalent,
      iii) adding from 0.1 to 3.0% by weight of a finely ground polyacrylamide powdered drift control agent to the above mixture while blending,
      iv) adding additional optional functionality to the formula by adding dry defoamer(0 to 5%), dry nonionic surfactants(0 to 30%), dry specialty sequestering agents and/or sequestered metals(0 to 50%) and/or, dry anticaking agents(0 to 1.5%) to the above mixture while blending
   b) passing the dry blended powder through a screening device such as a Sweeko or Azo sifter using a proper mesh screen(preferably 20 to 14 mesh) to remove excessively large unground particles, mill scale, and debris,
   c) passing dry blended and screened powder through additional screen prior to optionally packaging.

Typically the fertilizer is passed through a hammermill (such as a 3 TH model Micropulverizer or equivalent) using either no screen or a large gapped screen such as a "jump gap" screen designed to reduce the fertilizer particle size to a satisfactory range.

Typically, ammonium sulfate crystals are primarily larger than 45 mesh before milling. This is too large a particle to coat with a liquid of any significant concentration because the resultant mixture will tend to be sticky and not hold up to storage without forming lumps in the bags. The resultant mixture may be difficult to pour out and may not disperse readily. By controlling the resonance time in the mill and the type of screen, ammonium sulfate or other fertilizers can be ground so that the majority of the particles are in the range of 40 to 100 mesh with a heavy percentage in the 55 to 85 mesh range. It is also important not to overmill the fertilizer which would produce significant percentages of particles less than 130 mesh as they tend to cause lumps and mill scale which do not disperse readily.

Once the fertilizer is milled to the proper particle size it is charged into a ribbon blender where the other components of the composition are added. It is preferable to spray the liquid polyacrylamide emulsion/suspension first onto the fertilizer. The relatively large particle size of the fertilizer will accept the liquid spray without forming lumps or hard scale particles. This mixture is then blended until homogeneous and lump free. Other components such as those listed above are then added to the mixture and blended. The mixture may then be run through a post sifting device such as a Sweeko or Azo screen using a 14 mesh screen to remove any significant quantity of particles of higher than desired size. Usually, particles larger than 14 mesh represent mill scale caused by moisture or uneven polymer coating and need to be removed because of their difficulty in dispersing in the tank mix.

The effect of pump shear on drift management products has been studied extensively within the industry. All commercial sprayers use pumps to recirculate/agitate the holding tank as well as deliver the spray through the nozzles onto the proper target. Increased recirculation/agitiation results in larger numbers of passes through the pump. It is desirable for a drift management product to be effective in controlling droplet size and elasticity through several pump cycles. Historically, polyacrylamide emulsions or dispersions have been used effectively to reduce off target drift. Usually, these are 30 to 50% active polyacrylamide formulations which are used at 1 to 6 oz per 100 gallons spray mix or 1% active pre swelled polyacrylamide solutions which are used at 32 to 64 oz per 100 gallons. Powdered polyacrylamides of medium to high molecular weight such as Magnafloc 156 F are essentially 100% polyacrylamide and therefore very effective drift management components. This polymer is described in U.S. Pat. No. 5,529,975 which is incorporated herein by reference. However, when added to the spray mix these powders form instant gels which will not disperse properly and will clog up screens and nozzles. Other powdered polyacrylamide/xanthan gum combinations such as Sanitex 41A and 41A FG have been formulated with diluents to help dissolution to reduce similar gel blocking problems. The 41A material because of the larger particle size produces more "fish eyes" and is much worse at forming gel blocks than 41A FG which is finely ground to a smaller particle size. However, 41A FG is less efficient as a drift management component. Also, the dilution reduces the effectiveness of the polymer and requires substantially more polymer (3×) to achieve comparable results in drift control.

A solution to the gel blocking problem of the powdered polyacrylamide concentrate has been discovered as follows: 1) to finely grind the polyacrylamide to a smaller particle size than 41A FG, and 2) to formulate it into a diluted form with a higher use rate. Since fertilizer mixes (preferably ammonium sulfate) are recommended to be tank mixed with many pesticides such as glyphosate, dry powdered finely ground polyacrylamide was blended into a ground fertilizer such as ammonium sulfate. The resultant blend mixes and dissolves well with functionality as a drift control and deposition enhancement agent. See Table A which uses spray angle reduction and visual fines on a scale of 0 to 10 as a determinator of spray drift potential.

TABLE A

Evaluation of spray drift potential and gel formation on several formulations
Spray ran at 30 PSI through Tee Jet 8004 nozzle (10 is water-0 is no drift)
All formulations were evaluated in tap water at 1% dilutions

| Formulation | Drift potential | % +50 mesh gel bound |
|---|---|---|
| Water | 10 | 0% |
| Ammonium Sulfate (AMS) | 10 | 0% |
| AMS-99% + 0.5% Magnafloc 156F | 5 | 1% |
| AMS-99% + 1.0% Magnafloc 156F | 3 | 1% |
| AMS-99% + 0.5% 41 A FG | 8 | 9% |
| AMS-99% + 1.0% 41 A FG | 8 | 10% |
| AMS-99% + 1.5% 41 A FG | 7 | 15% |
| AMS-99% + 0.5% 41 A | 7 | 13% |
| AMS-99% + 1.0% 41 A | 7 | 19% |
| AMS-99% + 1.5% 41 A | 6 | 25% |

The use of a liquid polyacrylamide emulsion/dispersion concentrate was evaluated as an ingredient in preparing a dry free flowing powder with drift reduction properties. Percol E 38 from Ciba Specialties (see U.S. Pat. No. 5,529,975) was evaluated as a candidate because of the efficiency of the polymer concentrate(use level 2 to 6 oz per 100 gallons spray mix) and the ease of polymer dissolution. Formulations were prepared for drift reduction, long term storage, and ease of dissolution properties. The results in Table B show that while drift reduction efficiency was good using this process, there were storage and ease of dissolution issues to overcome. It was demonstrated that by the addition of certain anti caking compounds, shelf life and ease of dissolution was greatly increased.

TABLE B

Evaluation of spray drift potential and ease of dissolution before and after aging several formulations
Spray ran at 30 PSI through Tee Jet 8004 nozzle (10 is water-0 is no drift)
All formulations were evaluated in tap water at 1% dilutions
Aging was simulated by storing at 40° C. for one week

| Formulation | Drift potential 0 to 10 Initial | Drift potential 0 to 10 aged | Dissolution ease # inversions Initial | Dissolution ease # inversions aged |
|---|---|---|---|---|
| 99.5% AMS + 0.5% Percol E 38 | 5 | 5 | 3 | 8 |
| 99.5% AMS + 1.0% Percol E 38 | 3 | 3 | 3 | 12 |
| 99.5% AMS + 1.5% Percol E 38 | 2 | 2 | 4 | 15 |
| 99.0% AMS + 1.0% Percol E 38 + 1% Diatomaceous Earth Fine Grind | 3 | 3 | 3 | 5 |
| 99.0% AMS + 1.0% Percol E 38 + 1% Polymorphous Silica | 3 | 3 | 9 | 15 |

NOTE:
All samples showed effects of aging. The formulation with Diatomaceous Earth was most stable and least effected.

Based on the above data it was decided to evaluate blending portions of liquid polyacrylamide concentrates and finely ground polyacrylamide powdered concentrates and processing into a dry flowable fertilizer blend. In addition, the use of a dry defoamer—AU-319—was incorporated into the test to see if there were any adverse effects on the system. It was unexpected to discover that this combination of polyacrylamide components would solve the aging effects as well improve resistance to pump shear. It was later discovered that the difference in hydration rates of the two polyacrylamide components contributed to the increased resistance to pump shear. See Table C and D. The polyacrylamide components used according to the invention are characterized by a molecular weight ranging from 5,000,000 to 25,000,000, preferably 10,000,000 to 20,000,000. Preferably anionic polymers are used according to the present invention.

TABLE C

Evaluation of spray drift potential and ease of dissolution before and after aging several formulations
Spray ran at 30 PSI through Tee Jet 8004 nozzle (10 is water-0 is no drift)
All formulations were evaluated in tap water at 1% dilutions
Aging was simulated by storing at 40° C. for one week

| Formulation | Drift potential 0 to 10 Initial | Drift potential 0 to 10 aged | Dissolution ease # inversions Initial | Dissolution ease # inversions aged |
|---|---|---|---|---|
| 98.5% AMS + 0.5% Percol E 38 + 0.5% Magnafloc 156F + 0.5% Diatomaceous Earth | 4 | 4 | 3 | 5 |
| 98.5% AMS + 0.25% Percol E 38 + 1.0% Magnafloc 156F + 0.25% Diatomaceous Earth | 3 | 3 | 3 | 4 |

TABLE D

Evaluation of spray drift efficiency versus pump shear on several formulations
Spray ran at 30 PSI through Tee Jet 8004 nozzle (10 is water-0 is no drift)
All formulations except noted were evaluated in tap water at 1% dilutions

| Formulation | Drift potential (0 to 10) Cycles through the pump 1 | 5 | 9 |
|---|---|---|---|
| 98.5% AMS + 0.5% Percol E 38 + 0.5% Magnafloc 156F + 0.5% Diatomaceous Earth | 4 | 5 | 6 |
| 98.5% AMS + 0.25% Percol E 38 + 1.0% Magnafloc 156F + 0.25% Diatomaceous Earth | 3 | 4 | 5 |
| 99.0% AMS + 0.25% Percol E 38 + 0.5% Magnafloc 156F + 0.25% Diatomaceous Earth** | 3 | 3.5 | 4 |
| 98.5% AMS + 0.25% Percol E 38 + 1.0% Magnafloc 156F + 1.0% AU-319 + 0.25% Diatomaceous Earth | 3 | 4 | 5 |
| 99.0% AMS + 0.25% Percol E 38 + 0.5% Magnafloc 156F + 0.25% Diatomaceous Earth** | 3 | 3.5 | 4 |
| Array (Intec Commercial Product) | 3 | 3.5 | 4 |

NOTE:
**formulation was evaluated at 2% in tap water
Commercial formula prototypes were evaluated versus existing commercial products. The products were evaluated for droplet size control, for pump shear effects, for droplet adhesion or anti bounce properties, and for bio efficacy with glyphosate.

Commercial formula prototypes were evaluated versus existing commercial products. The products were evaluated for droplet size control, for pump shear effects, for droplet adhesion or anti bounce properties, and for bio efficacy with glyphosate.

See below results summary:

TABLE E

Droplet size comparison versus pump shear of several formulations

| Product | Use Rate | # pump cycles | %<150 u | %150–500 u | %>500 u |
|---|---|---|---|---|---|
| Water | as is | 0 | 12 | 81 | 7 |
| Water plus Roundup Ultra | 2.5% | 0 | 20 | 77 | 3 |
| Water plus Roundup Ultra plus 71100 | 2.5% 1.0% | 0 | 8 | 60 | 32 |
| | | 3 | 16 | 76 | 8 |
| | | 6 | 15 | 76 | 8 |
| | | 9 | 15 | 80 | 5 |
| Water plus RoundUp Ultra plus 91170 | 2.5% 2.0% | 0 | 5 | 54 | 41 |
| | | 3 | 15 | 74 | 11 |
| | | 6 | 15 | 76 | 9 |
| | | 9 | 15 | 75 | 10 |
| Water plus Roundup Ultra plus 93452 | 2.5% 2.3% | 0 | 5 | 48 | 47 |
| | | 3 | 11 | 72 | 17 |
| | | 6 | 13 | 75 | 12 |
| | | 9 | 15 | 75 | 10 |
| Water plus Roundup Ultra plus Array | 2.5% 1.0% | 0 | 7 | 57 | 36 |
| | | 3 | 12 | 69 | 11 |
| | | 6 | 16 | 73 | 11 |
| | | 9 | 16 | 73 | 11 |

TABLE F

% spray adhered to leaf surface of several formulations

| Product | Use Rate | % spray adhered to leaf surface |
|---|---|---|
| Water | as is | 20 |
| Water + Roundup Ultra | 2.5% | 48 |
| Water + Roundup Ultra + 71100 | 2.5%/1.0% | 63 |
| Water + Roundup Ultra + 91170 | 2.5%/2.0% | 67 |
| Water + Roundup Ultra + 93452 | 2.5%/2.3% | 73 |
| Water + Roundup Ultra + Array | 2.5%/1.0% | 73 |

TABLE G

% control of foxtail of several formulations

| Product | Use Rate | % control |
|---|---|---|
| Water | as is | 0 |
| Water + Roundup Ultra | 2.5% | 88 |
| Water + Roundup Ultra + 71100 | 2.5%/1.0% | 98 |
| Water + Roundup Ultra + 91170 | 2.5%/2.0% | 98 |
| Water + Roundup Ultra + 93452 | 2.5%/2.2% | 97 |
| Water + Roundup Ultra + Array | 2.5%/1.0% | 82 |

Based on the above information, below are examples of optimized formulations:

EXAMPLE 1

For product to be used at 9 to 12 lbs per 100 gallons spray mix containing glyphosate at recommended rates:

| Component | % by weight |
|---|---|
| Ammonium Sulfate | 97.5 |
| Magnafloc 156 Fine Grind (Ciba Specialties) | 1.00 |
| Percol E 38 liquid dispersion (Ciba Specialties) | 0.25 |
| Diatomaceous Earth Fine Grind | 0.25 |
| AU-319 powdered defoamer (silicone on sodium acetate) | 1.00 |

The product performance is represented by formula above - 71100

EXAMPLE 2

For product to be used at 17 lbs per 100 gallons spray mix containing glyphosate at recommended rates:

| Component | % by weight |
|---|---|
| Ammonium Sulfate | 98.3 |
| Magnafloc 156 Fine Grind (Ciba Specialties) | 0.60 |
| Percol E 38 liquid dispersion (Ciba Specialties) | 0.25 |
| Diatomaceous Earth Fine Grind | 0.25 |
| AU-319 powdered defoamer (silicone on sodium acetate) | 0.60 |

The product performance is represented by formula above - 91170

EXAMPLE 3

For product (containing a dry nonionic surfactant) to be used at 17 to 20 lbs per 100 gallons spray mix containing glyphosate at recommended rates:

| Component | % by weight |
|---|---|
| Ammonium Sulfate | 90.15 |
| Magnafloc 156 Fine Grind (Ciba Specialties) | 0.60 |
| Percol E 38 liquid dispersion (Ciba Specialties) | 0.25 |
| Diatomaceous Earth Fine Grind | 0.25 |
| AU-319 powdered defoamer (silicone on sodium acetate) | 0.75 |
| Synfactant powdered clathrate nonionic surfactant (Kalo Inc.) | 8.00 |

The product performance is represented by formula above - 93452

EXAMPLE 4

For product which contains dry nonionic surfactant to be used at 2 to 4 lbs per 100 gallons spray mix containing glyphosate at recommended rates:

| Component | % by weight |
|---|---|
| Ammonium Sulfate | 64.50 |
| Magnafloc 156 Fine Grind (Ciba Specialties) | 2.50 |
| Percol E 38 liquid dispersion (Ciba Specialties) | 0.25 |
| Diatomaceous Earth Fine Grind | 0.25 |
| AU-319 powdered defoamer (silicone on sodium acetate) | 2.50 |
| Citric Acid | 5.00 |
| Ammonium Phosphate | 10.00 |
| Ammonium Citrate | 5.00 |
| Synfactant powdered clathrate surfactant (Kalo, Inc.) | 10.00 |

-continued

For product which contains dry nonionic surfactant to be used at 2 to 4 lbs per 100 gallons spray mix containing glyphosate at recommended rates:

Particle size analysis of Magnafloc 156 F versus Sanitex 41A and 41A FG Typical values based on analysis of random commercial samples

| Sample | % +30 mesh | % +50 mesh | % +100 mesh | %−100 mesh |
|---|---|---|---|---|
| Magnafloc 156F 8 samples | 0 | | <0.2 | 10 to 25% | 60 to 90% |
| 41A 8 samples | 16 to 23% | | 56 to 70% | 80 to 87% | 12 to 15% |
| 41AFG 8 samples | 1 to 15% | | 6 to 40% | 25 to 86% | 28 to 68% |

Based on the above analysis, Magnafloc 156F delivers consistently a much higher % of particles both smaller than 50 or 100 mesh. Consequently, the ease of mixing is better with little or no "fish eyes" formed. Particles larger than 50 mesh will form "fish eyes". Particles larger than 30 mesh will form "large fish eyes". "Fish eyes" will clog up screens and nozzles as they swell up many times the original size during hydration.

An expression of molecule size on polyacrylamides is done two ways. There is an IV number which stands for Intrinsic Viscosity and is a measurable number. Typically mid to high molecular weight polyacrylamide polymers carry an IV number of 7 to 28 dl/g. These are ranges which have anti drift properties. The active polymers in Magnafloc 156F and Percol E 38 are typically in the 10 to 28 IV range. Secondly, this roughly translates to molecular weights of 5,000,000 to 25,000,000 as having practical anti drift applications.

Further variations and modifications of the foregoing will be apparent to those skilled in the art and are intended to be encompassed by the claims appended hereto.

We claim:

1. A free-flowing fertilizer comprising:
    i) from 25 to 99.5% by weight of a powdered water soluble nitrogen containing fertilizer,
    ii) from 0.05 to 1.5% by weight of a polyacrylamide liquid emulsion/dispersion,
    iii) from 0.1 to 3.0% by weight of a polyacrylamide powder whose particle size is 50 to 100 mesh in size.

2. The free-flowing fertilizer according to claim 1, wherein said water soluble nitrogen containing fertilizer is a member selected from the group consisting of ammonium sulfate, urea, ammonium nitrate, potassium nitrate and diammonium phosphate.

3. The free-flowing fertilizer according to claim 2, wherein said water soluble nitrogen containing fertilizer is ammonium sulfate.

4. The free-flowing fertilizer according to claim 1, which further contains from 0.5 to 5% of a powdered silicone defoamer on a water soluble powdered base.

5. The free-flowing fertilizer according to claim 1, which further contains from 0 to 30% of a nononionic powdered surfactant.

6. The free-flowing fertilizer according to claim 5, wherein said surfactant is a urea complex.

7. The free-flowing fertilizer according to claim 1, which further contains from 0 to 50% of sequestering agents or sequestered metals.

8. The free-flowing fertilizer according to claim 7, wherein said agent is ethylene diamine tetra acetic acid, or its salt, citric acid or its salts, or phosphoric acid salts.

9. The free-flowing fertilizer according to claim 1, which additionally contains from 0 to 1.5% of anti caking compounds.

10. The free-flowing fertilizer according to claim 1, which additionally contains finely ground diatomaceous earth, kaolin clay or, polymorphous silica.

11. A free-flowing fertilizer comprising:
    i) from 25 to 99% by weight of a powdered water soluble nitrogen containing fertilizer,
    ii) from 0.05 to 1.5% by weight of a polyacrylamide liquid emulsion/dispersion,
    iii) from 0.1 to 3.0% by weight of a polyacrylamide powder whose particle size has been reduced to be primarily 50 to 100 mesh in size,
    iv) from 0 to 5% of a powdered silicone defoamer or other suitable silicone defoamers on a water soluble powdered base,
    v) from 0 to 30% of a nonionic powdered surfactant,
    vi) from 0 to 50% of sequestering agent or sequestered metals,
    vii) from 0 to 1.5% of anti caking compounds.

12. The free-flowing fertilizer according to claim 11, wherein
    i) the powdered water soluble nitrogen containing fertilizer is ammonium sulfate, urea, ammonium nitrate, potassium nitrate, or diammonium phosphate,
    ii) the polyacrylamide liquid emulsion/dispersion is a high molecular weight nonionic or anionic polymer,
    iii) the polyacrylamide powder has a particle size has been reduced to be primarily 50 to 100 mesh in size,
    iv) the nonionic powdered surfactant is prepared as a clathrate urea complex,
    v) the sequestering agents or sequestered metals is ethylene diamine tetra acetic acid, or its salts, citric acid or its salts, or phosphoric acid salts and
    vi) the anti caking compound is finely ground diatomaceous earth, kaolin clay or polymorphous silica.

13. A process for manufacturing a free flowing, powder fertilizer composition comprising
    a) intimately blending
        i) from 25 to 99.5% by weight of the formula of a milled dry fertilizer,
        ii) spraying from 0.05 to 1.5% by weight of a liquid drift control agent onto the dry milled fertilizer while under constant blending,
        iii) adding from 0.1 to 3.0% by weight, of a finely ground polyacrylamide powdered drift control agent to above mixture while blending,
        iv) adding additional optional functionality to the formula by adding dry defoamer, dry nonionic surfactants, dry sequestering agents or sequestered metal and/or, dry anticaking agents to the above mixture while blending, to obtain a dry blended powder,
    b) passing the dry blended powder through a screening device using a mesh screen to remove unground particles, and mill scale,
    c) passing dry blended and screened powder through additional screen prior to optionally packaging.

14. The process according to claim 13 wherein the fertilizer is a member selected from the group consisting of ammonium sulfate, urea, ammonium nitrate, potassium nitrate and diammonium phosphate.

15. The process according to claim 13 wherein the liquid drift control agent is a polyacrylamide emulsion or dispersion.

16. A process for applying a free-flowing fertilizer to a crop comprising mixing the free-flowing fertilizer of claim 1 with a sufficient amount of water and spraying said crop.

17. A herbicidal formulation of improved characteristics comprising a herbicide and the free flowing fertilizer according to claim 1.

18. A method for improving the application of a herbicidal comprising blending a herbicide with the free flowing fertilizer according to claim 1 and applying the resulting blend to a crop.

* * * * *